United States Patent [19]

Fiske

[11] Patent Number: 4,986,925
[45] Date of Patent: Jan. 22, 1991

[54] CORROSION INHIBITORS AND DEICING AGENTS

[75] Inventor: Larry B. Fiske, Orting, Wash.

[73] Assignee: Georgia-Pacific Resins, Inc., Atlanta, Ga.

[21] Appl. No.: 392,066

[22] Filed: Aug. 10, 1989

[51] Int. Cl.$^5$ ............................ C09K 3/18; C09K 5/00
[52] U.S. Cl. ........................................ 252/70; 252/75; 252/78.1; 252/72; 252/71
[58] Field of Search ....................... 252/70, 75, 72, 71, 252/78.1

[56] References Cited

U.S. PATENT DOCUMENTS

| | | | |
|---|---|---|---|
| 2,410,910 | 11/1946 | Wait | 252/70 |
| 3,127,444 | 3/1964 | Tousignant et al. | 260/539 |
| 3,173,864 | 3/1965 | Freedman | 210/698 |
| 3,639,278 | 2/1972 | Hwa | 252/82 |
| 3,687,738 | 8/1972 | Malkin | 148/6.2 |
| 3,833,504 | 9/1974 | Neitzel et al. | 252/70 |
| 3,901,651 | 8/1975 | Benner et al. | 252/85 |
| 4,192,756 | 3/1980 | Mondshine | 252/8.55 R |
| 4,444,672 | 4/1984 | Gancy | 252/70 |
| 4,668,416 | 5/1987 | Neal | 252/70 |
| 4,803,007 | 2/1989 | Garber | 252/70 |

FOREIGN PATENT DOCUMENTS

| | | |
|---|---|---|
| 46-37641 | 11/1971 | Japan . |
| 7444986 | 9/1972 | Japan . |
| 916526 | 3/1982 | U.S.S.R. . |
| 1052523 | 3/1982 | U.S.S.R. . |

OTHER PUBLICATIONS

Kishitani, "Corrosion of Iron in Reinforced Concrete. Protective Effect of Calcium Lignosulfonate for Corrosion by Chloride", CA 74:145890.
Knoefel, "Corrosion of Concrete", CA 96:73669.
"Using Alkaline Sulfate Lignin for Modification of Polypropylene Compositions", CA 86:172319c.
Antonio, "Steel and Corrosion Some Methods of Protection", 67:14056.
"SRI Scientists Sees Alternative to Chloride Salts in Deicing Roads", Chemical Marketing Reporter, Aug. 27, 1984.
Robert L. Chance, "Corrosion, Deicing Salts, and the Environment", Materials Performance, Oct. 1974, pp. 16-22.
Dunn et al., "Alternative Highway Deicing Chemicals", Spec. Rept.-Natl. Res. Counc. Transp. Res. Board, vol. 185, pp. 261-269 (1979).

Primary Examiner—Paul Lieberman
Assistant Examiner—J. Silbermann
Attorney, Agent, or Firm—Banner, Birch, McKie & Beckett

[57] ABSTRACT

A process and composition for controlling ice and/or snow with reduced corrosion involves a mixture comprising an alkali metal salt; a lignosulfonate; and a corrosion reducing additive in the form of a salt of aluminum, antimony, cadium, cobalt, manganese, nickel, zinc, and combinations thereof.

16 Claims, No Drawings

CORROSION INHIBITORS AND DEICING AGENTS

BACKGROUND OF THE INVENTION

The present invention relates to deicing agents and their methods of use. More specifically, the present invention relates to a combination of spent sulfite liquor, chloride salts of alkali metals or alkaline earth metals as deicing agents, and one or more additives which reduce the corrosive tendencies of the deicing agent. The amount of corrosion damage normally encountered in road deicing is reduced by the present invention.

It is generally recognized that the needs of business, industry, and the general public demand that traffic be kept moving with reasonable safety in the face of snow or ice. Reliance on mechanical means of snow or ice removal alone, however, is insufficient to ensure the safe and efficient movement of traffic. At present the only feasible means for "bare pavement" maintenance is by the use of deicing salts. Rock salt or sodium chloride is the primary chemical used for deicing primarily because of its low cost, ease of transportation, and readily dispersible form.

The cost of deicing salt is deceptively low given the unassumed cost of corrosion to metal guardrails, bridge supports, metal concrete reinforcing rods and automobiles. The estimated cost of upgrading deficient bridges in the United States alone approaches $50 billion dollars. *Chemical Marketing Reporter*, Aug. 27, 1984.

Other chemicals have been used in place of alkali metal or alkaline earth metal chlorides, e.g. mixtures of urea and calcium formate with a formamide spray, calcium magnesium acetate, metal sulfates, phosphates, nitrates, amides, alcohols, long-chain amines, and sodium dichromate. None of these chemicals have gained wide-spread popularity due to their high cost, low effectiveness and/or high degree of toxicity. Chlorides remain the standard notwithstanding their corrosivity.

Some work has been performed on reducing the corrosivity of alkaline earth metal chloride salts applied to road surfaces by utilizing lignosulfonate as one component of a deicing agent. Japanese Pat. No. 51-12310 discloses the use of a three-part mixture of calcium chloride, a small amount of calcium lignosulfonate and calcium hydroxide as a dust-control or anti-freezing agent. A 1 to 3 percent (dry weight) mixture of calcium lignosulfonate to calcium chloride (lignosulfonate:calcium chloride ratio up to 1:35) was tested, with essentially no corrosion inhibition. Some rust preventing effect was observed when calcium hydroxide was combined with calcium chloride. When both calcium lignosulfonate and calcium hydroxide were mixed with calcium chloride, however, a greater rust-preventing effect was demonstrated and the Japanese patent is specifically directed to the combination that contains both lignosulfonate and calcium hydroxide in combination with calcium chloride. Each of the combinations disclosed in the Japanese patent contains 1-5% calcium lignosulfonate and also contains at least as much calcium hydroxide. Tests have demonstrated that those solutions have a pH of about 10 or higher.

Spent sulfite liquor has been used for many years as a dust-control agent applied directly to dirt or gravel roads. Use of chloride salts of alkaline earth metals to prevent dusting is also known. Freight considerations often determine whether spent sulfite liquor or chloride salts are used in any particular locality.

The prior art deicing agents such as sodium chloride, calcium chloride, magnesium chloride, or rock salt, ultimately cost the consuming public far more in corrosion damage than the initial material cost would indicate. Accordingly, a composition which alleviates the corrosion problem would be a highly desirable advance in the art of deicing agents for road surfaces.

Recently disclosed and commercialized under U.S. Pat. No. 4,668,416 is a deicing composition of one or more chloride salts and a lignosulfonate salt. The commercial composition comprises chlorides of sodium and magnesium in addition to lignosulfonate. The lignosulfonate additive is available under the name PCI ® and acts to decrease the corrosion rate of the mixture at pH values of about 4.5 to about 8.5. Notwithstanding the beneficial decrease in corrosion achieved with the '416 patent, it would be desirable to reduce the corrosive action of deicing agents even further.

SUMMARY OF THE INVENTION

It is an object of the invention to provide additives for deicing agent/lignosulfonate mixtures that reduce the corrosive effects of the deicing agent economically without impairing efficacy.

In accordance with these and other objectives which will become apparent from the description herein, the present invention provides a composition and a process for controlling ice with reduced corrosivity, the process comprising: applying to a surface that is at least partially covered with ice or snow a deicing composition comprising a lignosulfonate salt, an alkali and/or alkaline earth metal chloride salt, and a corrosion reducing additive comprising a salt of zinc, antimony, manganese, cadmium, nickel, cobalt, tin, aluminum, and combinations thereof. Desirably, the composition contains 75% or more of alkali and/or alkaline earth metal chloride (dry weight), 1-20% lignosulfonate, and greater than about 0.1% additive cation.

DETAILED DESCRIPTION

In accordance with this invention it has been discovered that where it is appropriate to use alkali metal chloride salts as deicing agents, the corrosiveness to virtually any metal surface (e.g., road barriers, bridges, concrete reinforcing rods and automobiles) may be significantly reduced by the addition of a lignosulfonate and an effective amount of a corrosion reducing additive salt comprising a cation of zinc, antimony, manganese, cadmium, nickel, cobalt, tin, aluminum, and combinations thereof. Zinc salts are preferred additives.

Preferably, the corrosion reducing additive salt or salts are water soluble for convenience and environmental safety although the exact species of salt is not critical. Sulfate or nitrate salts of the corrosion reducing additives become dominated by the chloride ions once in solution. Sulfate salts are preferred.

The effectiveness of alkali metal chloride salts in facilitating the deicing of roadways is attributable in part to their low cost, their ability to form a hole in an iced surface thereby allowing normal traffic to break up the sheets of ice, and the ease and uniformity by which they may be distributed over a road surface. Several species of alkali metal salts are currently used alone, as rock salt, and in various combinations with alkaline earth metal salts, e.g. sodium and/or potassium chloride in combination with calcium and, magnesium chloride.

See as an example U.S. Pat. No. 3,833,504 describing the use of brine from the Great Salt Lake as a road salt composition, the disclosure of which is herein incorporated by reference. All are contemplated for use in this invention and will be referred to as alkali(ne) chloride salts. Sodium chloride containing salts are most frequently used on roads and are preferred materials for the practice of this invention.

Lignosulfonate salts, as described in U.S. Pat. No. 4,668,416 (herein incorporated by reference), are ideal additives that are readily available at a relatively low cost, are effective in reducing corrosion, and are generally non-toxic. A convenient source of lignosulfonate salts is spent sulfite liquor. Spent sulfite liquor is a by-product of sulfite pulp mills in which wood or other plant materials are processed to separate the cellulose or pulp from the lignin. Such processes are, of course, well known. The principal ingredient of spent sulfite liquor as produced at the mill is lignosulfonate and is found generally to be present in amounts of from about 40% to abut 70% or more by total dry weight with the remainder consisting of carbohydrates and other organic and inorganic compounds. Spent sulfite liquors which have been subjected to fermentation to convert at least a portion of the carbohydrates to alcohol or to protein by-products (fermented spent sulfite liquor) or which have been subjected to alkali oxidation to produce vanillin (vanillin raffinate) are also contemplated as a source for lignosulfonate salts in this invention and are within the term "spent sulfite liquor" as used herein.

Spent sulfite liquor contains lignosulfonate as magnesium, calcium, sodium, potassium, or ammonium salts. Other lignosulfonate salts contemplated in the invention include the transition metal salts, e.g. lead, indium, the lanthanides, tantalum, molybdenum, thallium, arsenic, actinium, and the silicates. In another embodiment, the lignosulfonate salt can include cations of the additives according to the invention. The additive cations can provide some or all of the additive concentration for the invention, e.g. 1–100% of the total additive salt concentration. The lignosulfonate weight ratios referred to herein are with respect to the total salt weight unless otherwise indicated.

Corrosion reducing additives according to the invention are added to or used in conjunction with the alkali(ne) metal chloride and lignosulfonate mixture. The additives are desirably used in amounts that are effective for controlling ice with a level of corrosion that is less than that which occurs when the additives are not used. Those amounts are desirably within the range from about 75 wt % or more alkali(ne) metal chloride, 1–20 wt % lignosulfonate, and above about 0.1% additive cation. Preferably, the composition contains 80–94% alkali(ne) chloride, 4–10% lignosulfonate, and 0.2–3% additive cation. The particular amounts used of each may be somewhat higher or lower than these values depending on the specific salts used for each component of the mixture. Routine tests can be used to determine the optimum weight ratio for any given combination.

The mixtures of this invention desirably have pH from about 4.5 to about 8.5 although the composition is useful down to pH values of about 1–1.5. Mixtures that have a pH of from about 5 to about 8 are particularly preferred. Often the mixtures themselves will provide the desired pH but, if needed, the pH may be adjusted. If it is desired to adjust the pH upwardly any base can be used. Since the pH of many spent sulfite liquors tend to be slightly acidic, the need to adjust the pH downwardly occurs less frequently but may readily be accomplished by employing a mineral acid. The pH referred to herein is the pH determined when the mixtures of this invention are dissolved in water to provide a 10% by weight total solids concentration in the solution.

In operation, either liquid or dried spent sulfite liquor may be mixed with a solid or solution of alkali(ne) metal chloride salt (with subsequent drying if appropriate) and a corrosion reducing additive salt to provide liquid or solid mixtures contemplated by this invention. The spent sulfite liquor and corrosion reducing additive may also be formed into a concentrate either with or without some portion of alkali(ne) metal chloride, e.g. about 10 to about 70 wt % alkali(ne) chloride, more than about 25 wt % lignosulfonate, and about 0.5–20 wt % additive cation.

While, in one of its aspects, this invention contemplates applying a mixture of the ingredients to a surface covered at least partially with ice or snow, the invention also contemplates the separate application, either as a liquid or a solid, of each of the ingredients to such surfaces.

Since the ingredients are essentially in a physical mixture, any appropriate mixing device may be employed. Moreover, additional ingredients, such as a non-slipping agent, may also be added during the mixing. Conventional non-slipping agents include sand, limestone, cinder grit and the like.

Because ice supplies moisture, application of the mixture to iced roads or to roads in danger of icing can be accomplished either in the liquid or the solid form. Typically, salt mixtures are applied as solids in icing conditions. Such practice, however, does not foreclose the option of applying any or all of the ingredients in liquid form.

The amount of the material to be applied to a road surface will vary depending upon the severity of conditions. Dilute salt solutions tend to be more corrosive, apparently because more oxygen is dissolved in dilute salt solutions, and therefore, the total amount of lignosulfonate salt in solution on the road is a factor in minimizing corrosion. When a good deal of water is expected (e.g., from heavy icing or snow), higher lignosulfonate and/or higher application rates may be desirable. The ratio and/or amount to be applied, however, is easily within the skill of the art.

When a non-slipping agent, such as sand, limestone, cinder grit, or the like is present, the mixture may be blended to provide an aqueous suspension of the non-slipping agent. Alternatively, a dry mixture of lignosulfonate and non-slipping agent may be prepared and stored until needed for use in conjunction with an alkali(ne) metal chloride salt. The dry mixture can be prepared by simply mixing dry solids or by applying a sulfite liquor solution to the non-slipping agent and thereafter drying the mixture. Once again, the dried mixture can be applied to the surface separately or in admixture with the alkali(ne) metal chloride salt and the ingredients can be applied in any desired combination of liquid and solid forms.

The invention is further illustrated by the following specific examples. These examples are included for illustrative purposes and are not intended to limit the scope of the invention. In these examples, the pH was adjusted, unless otherwise noted, with the oxide or hydroxide of the metal cation corresponding to the metal of the metal chloride so that the pH values for the runs of each example were substantially the same in order to provide a basis for comparison.

EXAMPLES

In the following examples, the sample materials were tested by immersion in a solution of the test material according to the conditions described in the examples of U.S. Pat. No. 4,668,416 which has been previously incorporated by reference. All examples were tested at 3 g. NaCl per 100 g. of solution. The values are in terms of percent by weight of deicing composition. The corrosion rate is measured in thousandths of an inch per year. Additives were either chloride or sulfate salts which, as discussed above, convert to the ionic chloride forms in solution.

The Examples illustrate better corrosion reduction improvements with the additives according to the invention than without them.

| Zinc and Zinc/Aluminum: | | | | |
|---|---|---|---|---|
| NaCl | MgCl2 | Fermented, Spent Sulfite Liquor Solids | Additive | Corrosion |
| 100 | 0 | 0 | 0 | 55.7 |
| 99.7 | 0 | 0 | 0.16 (Zn) | 44.4 |
| 80 | 0 | 20 | 0 | 30.2 |
| 80 | 0 | 19.7 | 0.27 (Zn) | 11.0 |
| 80 | 0 | 19.2 | 0.20 (Zn/Al) | 18.8 |
| 99 | 1.0 | 0 | 0 | 41.8 |
| 98 | 0.1 | 0 | 0.1 (Zn) | 34.0 |
| 92 | 1.0 | 7.1 | 0 | 29.3 |
| 00 | 1.0 | 7.1 | 0.1 (Zn) | 24.9 |

| Cadmium: | | | |
|---|---|---|---|
| NaCl | Fermented, Spent Sulfite Liquor Solids | Additive | Corrosion |
| 100 | 0 | 0 | 55.7 |
| 96.8 | 0 | 2.0 (Cd) | 18.9 |
| 80 | 17.3 | 2.7 (Cd) | 7.5 |

| Cobalt: | | | |
|---|---|---|---|
| NaCl | Fermented, Spent Sulfite Liquor Solids | Additive | Corrosion |
| 100 | 0 | 0 | 55.7 |
| 96.8 | 0 | 1.45 (Co) | 14.1 |
| 80 | 17.3 | 1.2 (Co) | 8.7 |

| Manganese: | | | |
|---|---|---|---|
| NaCl | Fermented, Spent Sulfite Liquor Solids | Additive | Corrosion |
| 100 | 0 | 0 | 55.7 |
| 96.8 | 0 | 1.16 (Mn) | 35.0 |
| 80 | 17.3 | 0.96 (Mn) | 13.0 |

| Nickel: | | | |
|---|---|---|---|
| NaCl | Fermented, Spent Sulfite Liquor Solids | Additive | Corrosion |
| 100 | 0 | 0 | 55.7 |
| 96.8 | 0 | 1.45 (Ni) | 22.3 |
| 80 | 17.3 | 1.20 (Ni) | 13.4 |

| Antimony: | | | |
|---|---|---|---|
| NaCl | Fermented, Spent Sulfite Liquor Solids | Additive | Corrosion |
| 100 | 0 | 0 | 55.7 |
| 96.8 | 0 | 1.7 (Sb) | 41.3 |
| 80 | 17.3 | 1.4 (Sb) | 3.2 |

The examples presented herein are supplied to illustrate the invention. The scope and nature of the exemplified materials is not intended to act as a limitation on the scope of the appended claims.

I claim:

1. A process for deicing ice or snow-covered surfaces with reduced corrosivity, said process comprising: applying to a surface a deicing composition comprising: (1) an alkali and/or alkaline earth metal chloride; and (2) a lignosulfonate; and (3) an effective amount of a corrosion reducing additive salt of aluminum, antimony, cadmium, cobalt, manganese, nickel, zinc, and combinations thereof.

2. The process of claim 1 wherein said metal chloride, said lignosulfonate, and said corrosion reducing additive are added in dry form.

3. The process of claim 1 wherein said lignosulfonate comprises a spent sulfite liquor.

4. The process of claim 1 wherein said mixture comprises 75 wt % or more metal chloride, 1–20 wt % lignosulfonate, and above about 0.1 wt % corrosion reducing additive cation.

5. The process of claim 1 further comprising applying a non-slipping agent simultaneously with said mixture.

6. The process of claim 1 comprising applying said mixture at a pH from about 4.5 to about 8.5.

7. A process for deicing ice or snow-covered surfaces by a process comprising: applying to an ice or snow-covered surface a deicing composition consisting essentially of: (a) an alkali and/or alkaline earth metal chloride; (b) a lignosulfonate; and (c) an amount effective to reduce the corrosive effects of said metal chloride of an additive salt selected from the group consisting of aluminum, antimony, cadmium, cobalt, manganese, nickel, zinc, and mixtures thereof.

8. The process of claim 7 wherein the applying step comprises applying said deicing composition consisting essentially of at least 75 wt % of said metal chloride, about 1–20 wt % lignosulfonate, and more than about 0.1 wt % of said additive salt.

9. A composition for removing ice from a surface with reduced corrosivity, said composition comprising in combination: (1) ice and/or snow; (2) an alkali or alkaline earth metal chloride, (3) a lignosulfonate, and (4) an amount effective to reduce corrosion of a corrosion reducing additive salt of aluminum, antimony, cadmium, cobalt, manganese, nickel, zinc, and combinations thereof.

10. The composition of claim 7 wherein the composition comprises 80–94 wt % metal chloride, 4–10 wt % lignosulfonate, and 0.2–2% corrosion reducing additive cation.

11. The composition of claim 7 wherein the lignosulfonate comprises spent sulfite liquor.

12. The composition of claim 7 wherein said corrosion reducing salt comprises zinc chloride.

13. A concentrate composition comprising:
about 10 to about 70 wt % alkali and/or alkaline earth metal chloride;
more than about 25 wt % lignosulfonate; and
about 0.5–20 wt % additive cation.

14. A composition consisting essentially of: (a) an alkali and/or alkaline earth metal chloride; (b) a lignosulfonate; and (c) an amount effective to reduce the corrosive effects of said metal chloride of an additive salt selected from the group consisting of aluminum, antimony, cadmium, cobalt, manganese, nickel, zinc, and mixtures thereof.

15. The composition of claim 14 consisting essentially of at least 75 wt % of said metal chloride, about 1–20 wt % lignosulfonate, and more than about 0.1 wt % of said additive salt.

16. The composition of claim 14 consisting essentially of about 10 to about 70 wt % of said metal chloride, at least about 25 wt % lignosulfonate, and about 0.5 to about 20 wt % of said additive salt.

* * * * *